United States Patent
Gani et al.

(10) Patent No.: US 12,465,946 B2
(45) Date of Patent: Nov. 11, 2025

(54) METHOD FOR COMPACTING AN ANTICORROSION COATING

(71) Applicant: SAFRAN AIRCRAFT ENGINES, Paris (FR)

(72) Inventors: Léa Rebecca Gani, Moissy-Cramayel (FR); Maxence Gombault, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 156 days.

(21) Appl. No.: 17/773,389

(22) PCT Filed: Oct. 28, 2020

(86) PCT No.: PCT/FR2020/051946
§ 371 (c)(1),
(2) Date: Apr. 29, 2022

(87) PCT Pub. No.: WO2021/084205
PCT Pub. Date: May 6, 2021

(65) Prior Publication Data
US 2022/0410209 A1 Dec. 29, 2022

(30) Foreign Application Priority Data
Oct. 30, 2019 (FR) ...................................... 1912206

(51) Int. Cl.
*B05D 3/12* (2006.01)
*B05D 3/02* (2006.01)
*B05D 7/00* (2006.01)
*B24C 1/10* (2006.01)
*F01D 25/00* (2006.01)

(52) U.S. Cl.
CPC ............. *B05D 3/12* (2013.01); *B05D 3/0254* (2013.01); *B05D 7/546* (2013.01); *B24C 1/10* (2013.01); *F01D 25/005* (2013.01); *F05D 2220/30* (2013.01); *F05D 2240/60* (2013.01)

(58) Field of Classification Search
None
See application file for complete search history.

(56) References Cited

U.S. PATENT DOCUMENTS 4,036,602 A * 7/1977 Dean ....................... C23C 10/02
427/253
5,123,206 A * 6/1992 Woodson .............. B24C 7/0084
451/39
(Continued)

FOREIGN PATENT DOCUMENTS

CN 104349869 A 2/2015
CN 108367359 A 8/2018
(Continued)

OTHER PUBLICATIONS

International Search Report as issued in International Patent Application No. PCT/FR2020/051946, dated Feb. 16, 2021.
(Continued)

*Primary Examiner* — Alexander M Weddle
(74) *Attorney, Agent, or Firm* — Pillsbury Winthrop Shaw Pittman LLP

(57) ABSTRACT

A method for compacting an anticorrosion coating includes projecting water soluble particles.

14 Claims, 3 Drawing Sheets

(56) References Cited

U.S. PATENT DOCUMENTS

| | | | | |
|---|---|---|---|---|
| 5,308,404 A | * | 5/1994 | Yam | B24C 11/00 |
| | | | | 51/307 |
| 5,993,561 A | * | 11/1999 | Jarema | C09D 9/00 |
| | | | | 134/22.16 |
| 6,174,225 B1 | * | 1/2001 | Becker | B24C 1/003 |
| | | | | 451/39 |
| 9,394,448 B2 | * | 7/2016 | Belov | C04B 28/34 |
| 2002/0098776 A1 | | 7/2002 | Dopper | |
| 2006/0204665 A1 | * | 9/2006 | Buczek | C23C 22/74 |
| | | | | 427/458 |
| 2007/0141371 A1 | | 6/2007 | Hazel et al. | |
| 2011/0135877 A1 | * | 6/2011 | Ullerich | B24C 3/02 |
| | | | | 451/75 |
| 2012/0302140 A1 | | 11/2012 | Park | |
| 2013/0017327 A1 | * | 1/2013 | Seid | B23K 35/365 |
| | | | | 427/229 |
| 2013/0061877 A1 | * | 3/2013 | Nakagawa | B24C 1/086 |
| | | | | 134/7 |
| 2015/0158146 A1 | * | 6/2015 | Boulogne | B24C 1/10 |
| | | | | 451/38 |

FOREIGN PATENT DOCUMENTS

| | | | | |
|---|---|---|---|---|
| DE | 10 2009 015160 A1 | | 9/2010 | |
| DE | 10 2016 011808 A1 | | 4/2018 | |
| EP | 953410 A1 | * | 11/1999 | B24C 1/003 |
| EP | 1598444 A1 | * | 11/2005 | B24C 1/003 |
| EP | 3 459 474 A1 | | 3/2019 | |
| FR | 3 010 013 A1 | | 3/2015 | |
| FR | 3 040 013 A1 | | 2/2017 | |
| GB | 2175824 A | * | 12/1986 | B21C 23/22 |
| JP | 2009-012156 A | | 1/2009 | |
| WO | WO 91/15308 A1 | | 10/1991 | |
| WO | WO 2006/042506 A1 | | 4/2006 | |
| WO | WO 2015/074765 A1 | | 5/2015 | |

OTHER PUBLICATIONS

First Office Action as issued in Chinese Patent Application No. 202080076018.3, dated Jun. 30, 2023.

Second Office Action as issued in Chinese Patent Application No. 202080076018.3, dated Feb. 29, 2024.

Bu, Y., et al., Specialized English for University in Mechanical Engineering 2, pp. 278 279, Foreign Language Teaching and Research Press, Jul. 2002 (publication date: Jul. 31, 2002).

Third Office Action as issued in Chinese Patent Application No. 202080076018.3, dated Jun. 6, 2024.

Xudong, S., "Bridge Design Questions," p. 280, People's Transportation Press, Mar. 31, 2003, (English translation included).

European Office Action as issued in European Patent Application No. 20807837.8, dated Mar. 5, 2025.

* cited by examiner

[Fig 1]
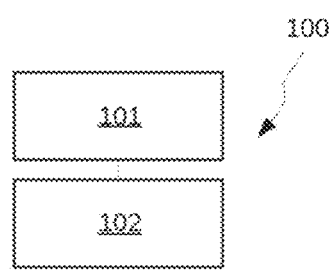
[Fig 2]
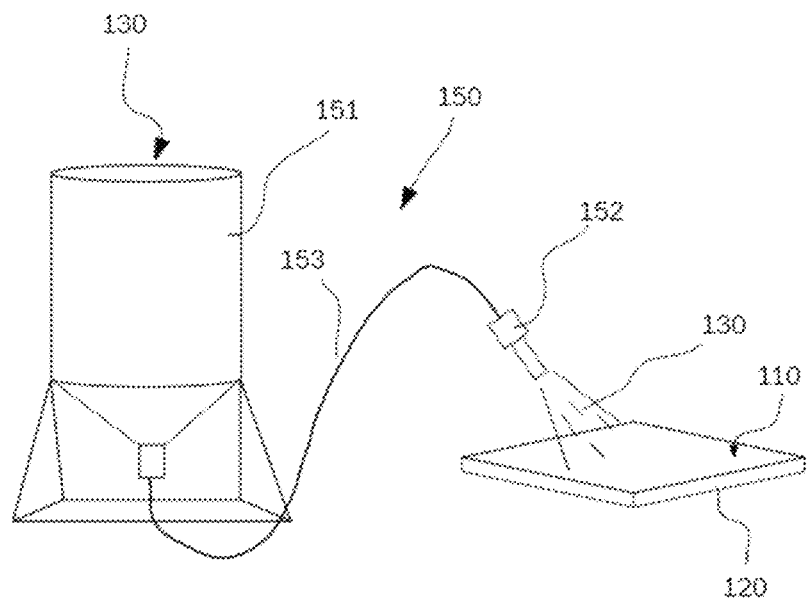

[Fig 3]
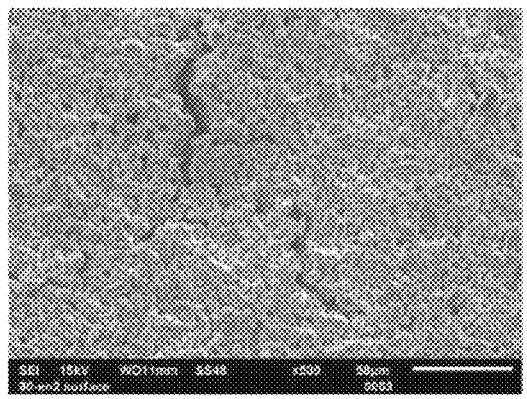
[Fig 4]
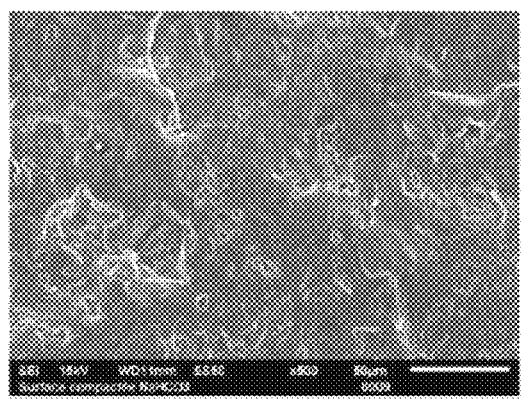

[Fig 5]
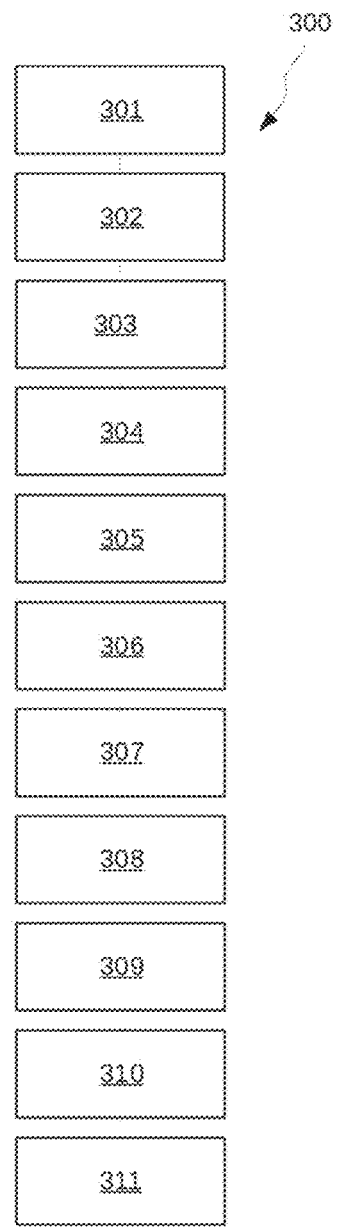

METHOD FOR COMPACTING AN ANTICORROSION COATING

CROSS-REFERENCE TO RELATED APPLICATIONS

This application is the U.S. National Stage of PCT/FR2020/051946, filed Oct. 28, 2020, which in turn claims priority to French patent application number 1912206 filed Oct. 30, 2019. The content of these applications are incorporated herein by reference in their entirety.

TECHNICAL FIELD OF THE INVENTION

The technical field of the invention is that of the protection of parts subjected to corrosion phenomena.

The technical field of the invention more particularly relates to the protection of steel parts by the application of a protective coating with different corrosive or oxidative anticorrosion elements, such as an inorganic paint.

The invention has a particularly interesting application in the field of turbomachines, notably for the protection of compressor shafts and turbine shafts of a turbomachine.

TECHNOLOGICAL BACKGROUND OF THE INVENTION

Steels, notably high mechanical strength steels, or heavily alloyed steels, such as for example Maraging steels, have high sensitivity to corrosion phenomena. On these steels, corrosion manifests itself mainly by the development of corrosive pitting on the surface.

In addition, the heavy mechanical loads on these parts have a tendency to increase the phenomenon of corrosion. It is thus imperative to apply a protective coating on these parts to prevent corrosion phenomena and to prolong the lifetime of the parts.

In the field of turbomachines, it is known to use as anticorrosion coating a paint based on a mineral or hybrid binder and metal particles for the protection of turbine or compressor shafts.

On account of the presence of chromium trioxide entering into the composition of these conventionally used mineral paints, their use is impacted by recent regulations.

Other paints based on mineral binder have thus been studied as substitution paints by replacing paints comprising chromium trioxide. All of these paints having a composition based on a mineral or hybrid binder and metal particles, such as aluminium. After application, these paints, with mineral or hybrid binder, have to undergo a polymerisation cycle at high temperature to cure the paint film. A final specificity, linked to the use of these paints, consists in carrying out an operation of compacting the paint layer, so as to bring into contact the metal particles on the surface to make the paint layer dense and electrically conductive, without degrading the physical integrity and the cosmetic aspect of the paint. Thanks to the compaction, the paint acquires high performance anodic sacrificial properties for combatting corrosion.

Unlike paints based on chromium trioxide not necessarily requiring compaction, this compaction step is a determining and obligatory step for substitution paints without chromium trioxide, this step guaranteeing the good anticorrosion properties of the coating.

This compaction step is conventionally carried out by projection of corundum (sanding), by projection of glass beads, by buffing or by raising the temperature.

During this compaction step, the compaction medium used (corundum or glass beads), of high hardness (comprised between 8 and 9.5 on the Mohs scale), can become incrusted on the surface of the paint layer and be released later, for example while in operation. This situation is particularly bothersome when the parts coated by these paints are turbomachine parts, such as for example turbine or compressor shafts, because the rejection of the compaction medium while in operation could damage certain parts of the turbomachine.

Consequently, in the field of turbomachines, in order to be free of any risk of damage, it is customary to not carry out this compaction for certain sensitive parts, such as turbine or compressor shafts. This has the consequence of considerably reducing the anticorrosion properties of the coatings.

In addition, when the paint layer is not compacted, it must be manually applied in two layers to limit as much as possible porosities of the coating, which increases the time for application and preparation of the parts. In addition, the control of thicknesses during this application is often delicate.

SUMMARY OF THE INVENTION

In this context, the invention proposes a novel method for compacting an anticorrosion coating making it possible to overcome the aforementioned drawbacks and making it possible to enhance the corrosion protection of parts while being free of the problems of release of the compaction medium while the parts are in use.

For this purpose, the invention relates to a method for compacting an anticorrosion coating characterised in that it comprises a step of projecting water soluble particles.

Apart from the characteristics mentioned in the preceding paragraph, the compaction method according to the invention may have one or more complementary characteristics among the following, considered individually or according to all technically possible combinations thereof:
- the water soluble particles projected during the projection step have a hardness less than 9 on the Mohs scale;
- the water soluble particles projected during the projection step have a density of the order of 2.2 g/cm3;
- the water soluble particles projected during the projection step are particles based on sodium hydrogen carbonate;
- the water soluble particles projected during the projection step incorporate an additive to avoid the agglomeration of the water soluble particles with one other; the water soluble particles projected during the projection step have a particle size comprised between 70 and 200 µm;
- the step of projecting water soluble particles is carried out at a pressure comprised between 1.5 and 4 bars, and preferentially 2 bars;
- the step of projecting water soluble particles is carried out with two passes of projecting water soluble particles;
- said two passes of projecting water soluble particles are carried out with a projection angle comprised between 45° and 90° with respect to a support on which said anticorrosion coating is applied;
- said compaction method comprises a rinsing step to eliminate residues of water soluble particles after projection;
- said compaction method is a method for compacting a paint based on metal particles and a mineral or hybrid binder.

The subject matter of the invention also comprises a method of applying a surface treatment on a support characterised in that it comprises:

a step of applying a first paint layer based on metal particles and a mineral or hybrid binder;

a step of heating said support;

a step of compacting said first paint layer based on metal particles and a mineral or hybrid binder according to the compaction method according to the invention.

The subject matter of the invention also comprises a method for applying a surface treatment on a support characterised in that it comprises successively:

a step of applying a first paint layer based on metal particles and a mineral or hybrid binder;

a first step of heating said support;

a step of applying a second paint layer based on metal particles and a mineral or hybrid binder;

a second step of heating said support;

a step of compacting said paint layers based on metal particles and a mineral or hybrid binder according to the compaction method according to the invention.

Advantageously, the support is a metal part.

Advantageously, the support is a part made of heavily alloyed steel.

The subject matter of the invention also comprises a turbomachine part characterised in that it comprises an anticorrosion coating applied by the method for applying a surface treatment according to the invention.

The invention and the different applications thereof will be better understood on reading the description that follows and by examining the figures that accompany it.

BRIEF DESCRIPTION OF THE FIGURES

The figures are only presented for indicative purposes and in no way limit the invention.

FIG. 1 illustrates a synoptic diagram illustrating the main steps of the compaction method according to the invention.

FIG. 2 is a simplified representation of a means for projecting particles used during the first step of the compaction method according to the invention.

FIG. 3 is a photograph taken by means of a scanning electron microscope illustrating the surface of a part coated by a mineral paint with aluminium particles before compaction.

FIG. 4 is a photograph taken by means of a scanning electron microscope illustrating the surface of the part coated by a mineral paint with aluminium particles illustrated in FIG. 4 after compaction by the compaction method according to the invention.

FIG. 5 illustrates a synoptic diagram illustrating the different steps of applying an anticorrosion coating on a turbomachine part.

Unless stated otherwise, a same element appearing in the different figures has a single reference.

DETAILED DESCRIPTION

FIG. 1 illustrates a synoptic diagram illustrating the main steps of the compaction method 100 according to the invention.

The compaction method 100 according to the invention enables the compaction of an anticorrosion coating 110 applied on a support 120, for example a part made of steel.

The compaction method 100 according to the invention is particularly interesting for the compaction of an anticorrosion coating 110 applied on a part made of high mechanical strength steel, or heavily alloyed steel.

The anticorrosion coating 110 is for example a high temperature mineral paint having a mineral or hybrid binder and metal particles such as aluminium particles.

The compaction method 100 according to the invention is advantageously a method for compacting an anticorrosion coating 110 of a turbomachine part 120.

The compaction method 100 according to the invention consists in projecting water soluble particles 130 on the layer of anticorrosion coating 110 to compact the latter and enhance its anticorrosion properties.

Advantageously, the particles 130 used in the compaction method 100 according to the invention are particles having a relatively low hardness, that is to say less than 9 on the Mohs scale, and preferentially less than 4.

Thus, during a first step 101, the compaction method 100 according to the invention consists in projecting water soluble particles 130 on the layer of anticorrosion coating 110 of the treated part 120.

This projection step 101 is carried out via an ad hoc projection means 150 making it possible to project water soluble particles 130 under pressure.

FIG. 2 illustrates an exemplary representation of a projection means 150 used for the compaction of the anticorrosion coating 110 according to the invention.

The projection means 150 is for example a high pressure or a low pressure sandblaster. The sandblaster conventionally has a storage tank 151 containing the water soluble particles 130 to project and a projection member 152 connected to said storage tank 151 via a feed duct 153.

The water soluble particles 130 are for example particles based on sodium hydrogen carbonate, also called sodium bicarbonate or bicarbonate of soda. The water soluble particles 130 based on sodium hydrogen carbonate advantageously have a hardness of 2.5 on the Mohs scale and a solubility comprised between 80 and 100 g/L in water at 20° C.

The water soluble particles 130 have a dimension comprised between 70 µm and 200 µm.

The water soluble particles 130 based on sodium hydrogen carbonate have a density of the order of 2.2 g/cm3.

In an optional manner, an additive is added to the water soluble particles 130 in order to avoid the agglomeration of the particles 130 with one other during storage and/or during projection.

The working pressure used for the projection of the water soluble particles 130 is of the order of 2 bars. This pressure is continuous and regulated at the level of the projection member 152, for example via a manometer (not represented) having a pressure regulating means.

The dosage of the projected quantity of water soluble particles 130 is based on a fixed calibration (for example determined by the size of the projection nozzle) and on the difference in pressure between the storage tank 151, storing the particles 130, and the working pressure used.

The water soluble particles 130 are projected with an angle comprised between 45° and 90° with respect to the anticorrosion coating 110 of the part 120 to treat.

This projection step 101 may comprise one or more passes of projecting water soluble particles 130. The different passes are carried out with a same projection angle or with a different projection angle (for example one pass with an angle of 45° with respect to the support and one pass with an angle of 90° with respect to the support).

The compaction method 100 according to the invention may also comprise, in an optional manner, a step of rinsing 102 the part 120 to eliminate residues of the projection medium. This rinsing step 102 makes it possible to ensure the elimination of residual water soluble particles 130 by solubility in water of the particles of sodium hydrogen carbonate.

Advantageously, this rinsing step 102 is carried out with distilled water.

This rinsing step 102 is an optional step because, given the low hardness of the water soluble particles 130 of sodium hydrogen carbonate (hardness of 2.5 on the Mohs scale), the water soluble particles 130 are only slightly, or even virtually not, incrusted in the layer of the anticorrosion coating 110 and the particles are easily eliminated.

This rinsing step 102 is particularly interesting to ensure the elimination of possible water soluble particles 130 incrusted in the layer of the anticorrosion coating 110, notably for sensitive parts, such as turbine shafts or turbomachine compressor shafts.

Photographs carried out by means of a scanning electron microscope make it possible to highlight the densification of the anticorrosion coating 110 after implementation of the compaction method 100 according to the invention.

FIG. 3 is a photograph taken by means of a scanning electron microscope illustrating the surface of a part coated by a mineral paint with aluminium particles before compaction.

FIG. 4 is a photograph taken by means of a scanning electron microscope illustrating the surface of the part coated by a mineral paint with aluminium particles illustrated in FIG. 4 after compaction by the compaction method 100 according to the invention.

It may be observed in FIG. 4 that the aluminium particles that compose the mineral paint of the coating are no longer independent of each other and form a continuous surface. The results thus obtained by the applicant are similar to the results obtained by a compaction of the prior art carried out with glass beads or corundum.

After compaction, the anticorrosion coating 110 conventionally has a uniform, glossy and smooth aspect. The electrical resistance of the compacted coating is less than 5 Ohms, or even less than 1 Ohm. The loss of thickness of the layer of coating following the compaction operation is limited and less than 10 μm.

The method for compacting 100 an anticorrosion coating 110 according to the invention makes it possible:
  to bring into contact the aluminium particles of mineral paints, based on a mineral binder and aluminium particles, used as anticorrosion coating;
  to densify the surface of the anticorrosion coating;
  to make the electrical resistance of the coating less than 5 Ohms, or even less than 1 Ohm;
  to increase the corrosion and temperature resistance of steel parts;
  not to degrade the adherence of the compacted paint.

The method for compacting 10 an anticorrosion coating 110 by projecting water soluble particles 130 according to the invention makes it possible to treat easily parts of complex geometry, of large dimensions.

The use of water soluble particles 130, such as particles of sodium bicarbonate, also provides a certain interest during its handling, its transport, on account of its innocuousness and its biodegradability.

The compaction method 100 described previously is perfectly integrated in an overall process of surface treatment of a part 120 made of steel by the application of an anticorrosion coating 110.

For that purpose, the invention also relates to a method of applying a surface treatment on a support 120, such as a part made of steel, notably comprising:

a step of applying a mineral paint layer:
  a step of drying;
  a step of compacting the mineral paint layer according to the compaction method 100 described previously.

As an example, and with reference to FIG. 5, a complete range of applying a surface treatment, such as an anticorrosion coating 110 formed by a mineral paint at high temperature, on a turbomachine part made of steel 120 will now be described.

Thus, the method for applying 300 a surface treatment of a turbomachine part 120 comprises:
  a step 301 of degreasing the surface of said part to treat 120;
  a step 302, optional, of masking certain zones of the part 120 which must not receive the paint;
  a step 303 of sandblasting said part 120 to promote the adherence of the paint on the surface of the part to treat;
  a step 304 of applying a first mineral paint layer;
  a step 305 of desolvation and drying of said first mineral paint layer;
  a step 306 of heating said part 120 (for example 30 min minimum at 340° C.) to polymerise said first mineral paint layer;
  a step 307 of applying a second mineral paint layer;
  a step 308 of desolvation and drying of said second mineral paint layer;
  a step 309 of heating said part 120 (for example 30 min minimum at 340° C.) to polymerise said second mineral paint layer;
  a step 310 of compacting said paint layers by projecting water soluble particles 130 according to the method 100 described previously;
  a step 311 of controlling, for example, the aspect, homogeneity, thicknesses, adherence, etc.

Advantageously, the turbomachine part is a turbine shaft or a compressor shaft.

The invention claimed is:

1. A method for obtaining an anticorrosion coating with anodic sacrificial properties on a steel support, comprising:
    applying on the steel support a first paint layer comprising independent aluminium particles and a mineral binder;
    drying the first paint layer;
    heating said support;
    compacting said first paint layer such that it has a resistance less than 5 Ohms, without reducing said first paint layer thickness by more than 10 μm, without degrading the adherence of said first paint layer by projecting water soluble particles comprising sodium hydrogen carbonate on said first paint layer comprising independent aluminium particles and a mineral binder;
    eliminating encrusted water soluble particles comprising sodium hydrogen carbonate by rinsing the first paint layer with water.

2. The method for obtaining an anticorrosion coating with anodic sacrificial properties on a steel support according to claim 1, wherein the water soluble particles projected during the projecting have a hardness less than 9 on the Mohs scale.

3. The method for obtaining an anticorrosion coating with anodic sacrificial properties on a steel support according to claim 1, wherein the water soluble particles projected during the projecting have a density of 2.2 g/cm3.

4. The method for obtaining an anticorrosion coating with anodic sacrificial properties on a steel support according to claim 1, wherein the water soluble particles projected during the projecting have a particle size comprised between 70 μm and 200 μm.

5. The method for obtaining an anticorrosion coating with anodic sacrificial properties on a steel support according to claim 1, wherein the projecting of water soluble particles is carried out at a pressure comprised between 1.5 bars and 4 bars.

6. The method for obtaining an anticorrosion coating with anodic sacrificial properties on a steel support according to claim 5, wherein the pressure is 2 bars.

7. The method for obtaining an anticorrosion coating with anodic sacrificial properties on a steel support according to claim 1 comprising successively:
applying on the steel support a first paint layer comprising independent aluminium particles and a mineral binder;
drying the first paint layer;
first heating said support;
applying a second paint layer comprising independent aluminium particles and a mineral binder;
drying the second paint layer;
second heating said support;
compacting said first paint layer and said second paint layer such that each paint layer has a resistance less than 5 Ohms, without reducing said first and second paint layer thickness by more than 10 µm, without degrading the adherence of said first and second paint layers by projecting water soluble particles comprising sodium hydrogen carbonate on said first and second paint layers, comprising independent aluminium particles and a mineral binder;
eliminating encrusted water soluble particles comprising sodium hydrogen carbonate by rinsing the first and second paint layers with water.

8. A turbomachine part comprising an anticorrosion coating obtained according to the method for obtaining an anticorrosion coating with anodic sacrificial properties on a steel support according to claim 1.

9. The method for obtaining an anticorrosion coating with anodic sacrificial properties on a steel support according to claim 1, wherein the steel is a maraging steel.

10. The method for obtaining an anticorrosion coating with anodic sacrificial properties on a steel support according to claim 1 comprising successively:
degreasing a surface of the steel support;
sandblasting the surface to promote adherence of the anticorrosion surface treatment on the surface;
applying on the sandblasted surface a first paint layer comprising independent aluminium particles and a mineral binder;
drying the first paint layer;
heating said support for at least 30 minutes at 340° C.;
compacting said first paint layer such that it has a resistance less than 5 Ohms, without reducing said first paint layer thickness by more than 10 µm, without degrading the adherence of said first paint layer, by projecting water soluble particles comprising sodium hydrogen carbonate on said first paint layer comprising independent aluminium particles;
eliminating encrusted water soluble particles comprising sodium hydrogen carbonate by rinsing the first paint layer with water.

11. The method for obtaining an anticorrosion coating with anodic sacrificial properties on a steel support according to claim 1 comprising successively:
degreasing a surface of the steel support;
sandblasting the surface to promote adherence of the anticorrosion surface treatment on the surface;
applying on the sandblasted surface a first paint layer comprising independent aluminum particles and a mineral binder;
drying the first paint layer;
first heating said support for at least 30 minutes at 340° C.;
applying a second paint layer comprising independent metal particles;
drying the second paint layer;
second heating said support for at least 30 minutes at 340° C.;
compacting said first paint layer and said second paint layer such that each paint layer has a resistance less than 5 Ohms, without reducing said first and second paint layer thickness by more than 10 µm, without degrading the adherence of said first and second paint layers by projecting water soluble particles comprising sodium hydrogen carbonate on said first and second paint layers comprising independent aluminum particles and a mineral binder; and
eliminating encrusted water soluble particles comprising sodium hydrogen carbonate by rinsing the first and second paint layers with water.

12. The method for obtaining an anticorrosion coating with anodic sacrificial properties on a steel support according to claim 1, wherein said projecting of water soluble particles is carried out with one pass with a projection angle of 45° and a second pass with a projection angle of 90° with respect to said support.

13. The method for obtaining an anticorrosion coating with anodic sacrificial properties on a steel support according to claim 1, wherein said first paint layer resistance is made less than 1 Ohm.

14. A method for obtaining an anticorrosion coating with anodic sacrificial properties on a steel support, comprising, in order:
applying on the steel support a first paint layer comprising independent aluminum particles and a mineral binder;
drying the first paint layer;
heating the support;
compacting the first paint layer by less than 10 µm such that it has a resistance of less than 1 ohm, without reducing said first paint layer thickness by more than 10 µm, by projecting water soluble particles comprising sodium hydrogen carbonate on said first paint layer comprising independent aluminum particles and a mineral binder, such that the independent aluminum particles form a continuous surface; and
eliminating encrusted water soluble particles comprising sodium hydrogen carbonate by rinsing the first paint layer with water.

* * * * *